United States Patent
Mohr et al.

(10) Patent No.: US 11,467,063 B2
(45) Date of Patent: Oct. 11, 2022

(54) PROBE CARRIER ARRANGEMENT

(71) Applicant: Purem GmbH, Neunkirchen (DE)

(72) Inventors: Ralf Mohr, Heidelberg (DE);
Veronique Guerin, Stuttgart (DE);
Kresimir Jambrosic, Reichenbach (DE); Ulrich Sigel, Plochingen (DE);
Arnulf Spieth, Hochdorf (DE);
Michael Vogel, Esslingen (DE);
Philippe Leisten, uml u+ee bgarten (DE)

(73) Assignee: Purem GmbH, Neunkirchen (DE)

( * ) Notice: Subject to any disclaimer, the term of this patent is extended or adjusted under 35 U.S.C. 154(b) by 45 days.

(21) Appl. No.: 16/799,472

(22) Filed: Feb. 24, 2020

(65) Prior Publication Data
US 2020/0271546 A1    Aug. 27, 2020

(30) Foreign Application Priority Data
Feb. 26, 2019    (DE) ............. 10 2019 104 770.6

(51) Int. Cl.
G01M 15/10        (2006.01)
G01N 27/416       (2006.01)

(52) U.S. Cl.
CPC ...... G01M 15/102 (2013.01); G01N 27/4162 (2013.01); F01N 2560/06 (2013.01)

(58) Field of Classification Search
CPC ............. G01M 15/102; G01N 27/4162; F01N 2560/06; F01N 13/16; F01N 2560/00; F01N 2450/22; F01N 2450/16; F01N 13/008; F01N 11/00; F16L 41/008
See application file for complete search history.

(56) References Cited

U.S. PATENT DOCUMENTS

| | | | |
|---|---|---|---|
| 4,495,810 A | 1/1985 | Tessarzik et al. | |
| 5,836,155 A * | 11/1998 | Katoh | F01N 13/12 60/276 |
| 2005/0155408 A1* | 7/2005 | Weyl | G01K 1/14 73/23.31 |
| 2006/0171865 A1 | 8/2006 | Quackenbush | |

(Continued)

FOREIGN PATENT DOCUMENTS

| | | |
|---|---|---|
| CN | 201697719 U | 1/2011 |
| CN | 206571554 U | 10/2017 |
| CN | 108087077 A | 5/2018 |

(Continued)

OTHER PUBLICATIONS

DodgeCharger Forum, p. 2, John Kunkel, 2016, www.dodgecharger.com (Year: 2016).*

Primary Examiner — Eric S. McCall
Assistant Examiner — Timothy P Graves
(74) Attorney, Agent, or Firm — McGlew and Tuttle, P.C.

(57) ABSTRACT

A probe carrier arrangement, especially for an exhaust system of an internal combustion engine, includes a probe socket (14) provided at a probe carrier body (12). The probe socket (14) has at least one insert-receiving opening (24) extending in a direction of an insert-receiving opening longitudinal axis (E). A probe carrier insert (28) is arranged in the insert-receiving opening (24). The probe carrier insert (28) has at least one probe-receiving opening (36) extending in a direction of a probe-receiving opening longitudinal axis (S).

15 Claims, 2 Drawing Sheets

(56) References Cited

U.S. PATENT DOCUMENTS

2007/0178026 A1    8/2007  Roth et al.
2015/0047616 A1*  2/2015  Eller .......................... F01N 3/36
                                                                                                 123/558

FOREIGN PATENT DOCUMENTS

| DE | 10210313 A1 | 10/2003 | |
|---|---|---|---|
| DE | 10324956 A1 | 1/2005 | |
| DE | 102006044736 A1 | 3/2008 | |
| DE | 10 2010 031656 A1 | 1/2012 | |
| DE | 10 2016 113231 A1 | 1/2018 | |
| GB | 2027884 A | 2/1980 | |
| JP | 2016138514 A | 8/2016 | |
| WO | WO-2012010379 A1 * | 1/2012 | ........... G01N 27/407 |

* cited by examiner

PROBE CARRIER ARRANGEMENT

CROSS REFERENCE TO RELATED APPLICATIONS

This application claims the benefit of priority under 35 U.S.C. § 119 of German Application 10 2019 104 770.6, filed Feb. 26, 2019, the entire contents of which are incorporated herein by reference.

TECHNICAL FIELD

The present invention pertains to a probe carrier arrangement, which may be used, for example, to arrange a measuring probe, for example, an oxygen sensor, a temperature sensor or the like at an exhaust system of an internal combustion engine such that information on exhaust gas flowing in the exhaust system can be provided by such a measuring probe.

TECHNICAL BACKGROUND

To mount measuring probes on an exhaust system of an internal combustion engine, a probe socket may be fixed by welding on an exhaust gas-carrying housing, for example, a catalytic converter device housing, a particle filter housing or a pipe. Probe-receiving openings are formed in the probe socket and in the exhaust gas-carrying housing for receiving a measuring probe, so that this measuring probe can interact with the exhaust gas flowing in the housing. To fix the measuring probe at the probe socket, an internal thread, with which an external thread formed on the outer circumference of the measuring probe can be caused to mesh, may be formed in a probe-receiving opening of the probe socket in order to guarantee in this manner a stable connection of the measuring probe, which connection is especially also tight against the escape of exhaust gas.

SUMMARY

An object of the present invention is to provide a probe carrier arrangement, especially for an exhaust system of an internal combustion engine, with which an improved connection of a measuring probe can be guaranteed.

This object is accomplished according to the present invention by a probe carrier arrangement, especially for an exhaust system of an internal combustion engine, comprising a probe socket provided at a probe carrier body with at least one insert-receiving opening extending in the direction of an insert-receiving opening longitudinal axis and a probe carrier insert arranged in the insert-receiving opening with at least one probe-receiving opening extending in the direction of a probe-receiving opening longitudinal axis.

In the case of the configuration of a probe carrier arrangement according to the present invention, the two functionalities for integrating same in the area of the probe socket, for example, into an exhaust system, on the one hand, and for connecting a measuring probe, on the other hand, are separated from one another and are split between the two elements, namely, probe socket and probe carrier insert. Each of these two elements may thus be configured optimally for the function to be provided by these respective elements, especially provided with a material especially suitable for that purpose. The probe socket to be connected to the probe carrier body may be provided with a material that guarantees an especially simple and stable connection to the probe carrier body, and the probe carrier insert may be provided with a material especially suitable for a stable and corrosion-resistant connection of a measuring probe. Since these two functionalities are split between different elements, the material used to make the probe carrier insert can easily be adapted to a measuring probe used for a special purpose, without it even being necessary to make changes in the area of the probe socket.

In an embodiment that can be embodied in a structurally simple manner, the probe socket may be configured separately from the probe carrier body and may be fixed to the probe carrier body by connection in substance, preferably by welding.

To reduce the number of components to be used and to provide an especially stable connection of the probe socket to the probe carrier body, it is proposed that the probe socket be configured integrally with the probe carrier body, preferably by flow drilling. It should be pointed out in this connection that an integral configuration means in the sense of the present invention that the probe carrier body and the probe socket are not provided and connected to one another as separate components, but are manufactured from a block of material, i.e., in one piece, for example, by shaping a blank for the probe carrier body.

A stable connection of the probe carrier insert to the probe socket may be achieved, for example, by the probe carrier insert being connected to the probe socket by thread meshing. For example, an internal thread may be provided for this purpose on an inner circumferential area of the insert-receiving opening, and an external thread meshing with the internal thread of the probe socket may be provided on an outer circumferential area of the probe carrier insert.

Provisions may be made, as an alternative, in an embodiment that does not require the preparation of thread formations and can be embodied in a simple manner for an inner circumferential area of the insert-receiving opening or/and an outer circumferential area of the probe carrier insert to be configured in an essentially unstructured form, preferably essentially in a cylindrical form.

Stable holding of the probe carrier insert in the probe socket can be ensured in this connection, especially during a phase before a measuring probe is received in the probe carrier insert, or, for example, before a connection is established by connection in substance between the probe socket and the probe carrier insert, by the probe carrier insert being received in the insert-receiving opening of the probe socket with a press fit.

For an especially stable and gastight connection, the probe carrier insert may be connected to the probe socket or/and to the probe carrier body by connection in substance, preferably welding.

A defined positioning of the probe carrier insert in the insert-receiving opening can be achieved hereby and it can be maintained especially also after insertion of a measuring probe if the probe carrier insert has an insert flange projecting radially outwards in relation to the probe-receiving opening longitudinal axis and is supported in the direction of the probe-receiving opening longitudinal axis at the probe socket or/and at the probe carrier body.

If such an insert flange is present, this may also be used at the same time to connect the probe carrier insert to the probe socket or/and to the probe carrier body in the area of the insert flange by connection in substance.

If a probe support surface enclosing the probe-receiving opening in the probe carrier insert is formed at the probe carrier insert in the area of the insert flange, a mutual contact of materials of a measuring probe, on the one hand, and of the probe carrier insert, on the other hand, which said materials have a low tendency to corrosion, is brought about in this area as well.

In an alternative embodiment, a probe support surface enclosing the insert-receiving opening may be formed at the probe socket at an axial end located at a distance from the probe carrier body. In order to make it possible to guarantee an especially stable fixation for the probe carrier insert by axial bracing, it is proposed that the insert flange be supported at an axial end of the probe socket, which end is located close to the probe carrier body.

The configuration according to the present invention of a probe carrier arrangement may be used in an especially advantageous manner if an element of probe socket and probe carrier insert is made of an austenitic material and the other element of the probe socket and probe carrier insert is made with a ferritic material. It should, however, be stressed, in principle, that the probe carrier arrangement configured according to the present invention may also be provided with materials of the same group of materials for the probe socket and for the probe carrier insert.

The present invention pertains, furthermore, to an exhaust system for an internal combustion engine, comprising at least one probe carrier arrangement configured according to the present invention, wherein the probe carrier body is provided by an exhaust gas-carrying housing. A probe support surface may be formed in this exhaust system for a measuring probe received in the probe-receiving opening at an axial end of the probe socket, which end is located at a distance from the housing, or of the probe carrier insert.

If the probe carrier insert is connected to the probe socket in an axial end of the probe socket, which is located at a distance from the housing, by connection in substance, such a connection is prepared in an area that is subject to a lower thermal stress, so that stresses generated by different thermal expansions of the probe socket, on the one hand, and of the probe carrier insert, on the other hand, are also unable to lead to damage to this connection in the area of such a connection prepared by connection in substance.

If the probe carrier insert has an insert flange supported axially at the probe socket, it is especially advantageous if the insert flange is supported at an axial end of the probe socket, which end is located close to the housing. An axial bracing of the measuring probe in relation to the probe carrier insert can thus be generated by screwing a measuring probe into the probe carrier insert, as a result of which a defined positioning of the measuring probe and of the probe carrier insert, which is also not compromised by high thermal stress, can also be guaranteed.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
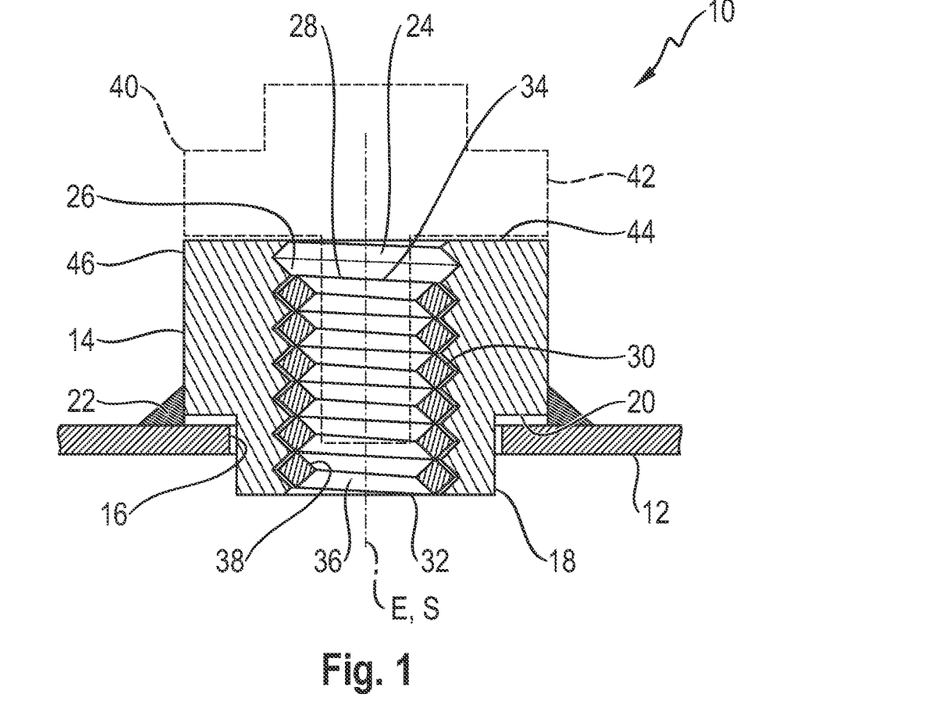
FIG. 1 is a sectional view of a probe carrier arrangement with a measuring probe carrier thereon.

Referring to the drawings, a probe carrier arrangement to be used especially in the area of an exhaust system of an internal combustion engine in a vehicle is generally designated by 10 in FIG. 1. The probe carrier arrangement 10 comprises a probe carrier body 12, which may be provided, for example, by an exhaust gas-carrying pipe of an exhaust system or a housing of an exhaust gas treatment unit, for example, a catalytic converter device or a particle filter.

A probe socket 14 is arranged at the probe carrier body 12. The probe carrier body 12 has for this purpose an opening 16, with which meshes an end of the 18 of the probe socket 14, which end is located close to the probe carrier body 12. The probe socket 14 may be positioned with a radial shoulder 20 such that it lies on an outer surface of the probe carrier body 12, so that a defined positioning of the probe socket 14 at the probe carrier body 12 is preset. A fixed connection of the probe socket 14 to the probe carrier body may be provided by connection in substance, for example, a weld seam 22 extending circumferentially without interruption, as a result of which a gastight closure is also guaranteed at the same time in the area of the transition between the probe socket 14 and the probe carrier body 12. It should be pointed out that the welded connection between the probe socket 14 and the probe carrier body 12 may be prepared by many different welding methods, for example, capacitor discharge welding, laser welding, electron beam welding, ultrasonic welding or friction welding.

An insert-receiving opening 24 extending in the direction of the insert-receiving opening longitudinal axis E is formed in the probe socket 14. An internal thread 26 is formed on the inner circumference of said opening or on the inner circumference of the probe socket 14.

A probe carrier insert 28 is arranged in the insert-receiving opening 24. The probe carrier insert 28 is configured in the exemplary embodiment shown in FIG. 1 in the manner of a spindle and it has an external thread 30 on its outer circumference. With this external thread 30 the probe carrier insert 28 is in thread meshing with the internal thread 26 of the probe socket 14, so that a defined positioning is guaranteed, in principle, between these two elements by the frictional interaction generated during this thread meshing between the probe socket 14 and the probe carrier insert 28. Provisions may be made, for example, in this connection for the probe carrier insert 28 not to project axially over the insert-receiving opening 24 formed in the probe socket 14 either in the area of its axial end 32 located close to the probe carrier body 12 or in its axial end 34 located at a distance from the probe carrier body 12.

A probe-receiving opening 36 is formed in the probe carrier insert 28. The probe-receiving opening 36 extends completely through the probe carrier insert 28 in the direction of a probe-receiving opening longitudinal axis S, and the probe-receiving opening 36 and the insert-receiving opening 24 may be arranged coaxially to one another, so that their longitudinal axes E and S correspond to one another.

An internal thread 38 is provided on an inner circumference of the probe-receiving opening 36 or of the probe carrier insert 28. A shaft area of a measuring probe 40, suggested in FIG. 1, which said shaft area is provided with an external thread, is screwed into this internal thread 38. A head area 42 of the measuring probe 40 is supported in the installed state either directly or optionally via the intermediary of a sealing element on a probe support surface 44, which is configured at an axial end 46 of the probe socket 14, which said axial end is located at a distance from the probe carrier body 12, such that it encloses the insert-receiving opening 24 in a ring-like manner. The axial end 46 of the probe socket 14 is consequently located at a greater distance from the probe carrier body 12 than is the axial end 18.

Via the probe-receiving opening 36 formed in the probe carrier insert 28 and also via the insert-receiving opening 24 formed in the probe socket 14, both of which probe-receiving opening 36 and insert-receiving opening 24 are open to a volume that is enclosed by the probe carrier body 12 and both of which carry an exhaust gas flow, the measuring probe 40 can interact with the exhaust gas flowing in this volume. For example, the measuring probe 40 may be configured as an oxygen sensor, which detects the oxygen content. As an alternative, the measuring probe 40 may be configured as a temperature sensor or as another sensor suitable for detecting the composition of the exhaust gas. It should also be pointed out that a plurality of probe carrier arrangements 10 receiving such measuring probes 40 of different types may be provided in a suitable positioning in an exhaust system.

Respective materials especially suitable for the functionality of the probe socket and the probe carrier insert may be selected for the probe socket 14, on the one hand, and the probe carrier insert 28, on the other hand. For example, the probe socket 14 may thus be made with a material that guarantees a very stable connection in substance to the probe carrier body 12 even under thermal stress. If, for example, the probe carrier body 12 is made with a ferritic metallic material, it is especially advantageous to also make the probe socket 14 with a ferritic metallic material, because it is guaranteed in this case that these materials will have essentially the same expansion relative to one another and stresses representing a special load for the connection in substance will not therefore essentially develop in the area in which the probe socket 14 and the probe carrier body 12 adjoin each other, especially where the connection by connection in substance is prepared.

The probe carrier insert 28 may be made with a material that is especially suitable for the interaction of the connection with the measuring probe 40 to be positioned therein. If such a measuring probe 40 is made with an austenitic metallic material, especially where this probe has an external thread in the area to be caused to mesh with the internal thread 38, it is especially advantageous to make the probe carrier insert 28 with an austenitic metallic material as well. It is guaranteed hereby, on the one hand, that these two elements will also have approximately equal thermal expansions relative to one another when such an exhaust system is being heated or cooled. On the other hand, the risk of corrosion, which may lead to seizing of the measuring probe 40 in the probe carrier insert 28, is reduced hereby.

If ferritic metallic material is used for the probe socket 14, while austenitic metallic material is used for the probe carrier insert 28, this means that the probe carrier insert 28 will expand to a markedly greater extent than the probe socket 14 based on the markedly different coefficients of thermal expansion of these materials during heating of the probe carrier arrangement 10. The stress exerted hereby on the probe socket 14 can lead to a slight plastic deformation of the probe socket 14, as a consequence of which a slight clearance could develop in the threads 26, 30 meshing with one another during the subsequent cooling. Repeatedly occurring heating and cooling processes and plastic deformations occurring in the process could also lead to a loosening of the thread meshing when the probe socket 14 is made of an austenitic metallic material and the probe carrier insert 28 is made of a ferritic metallic material. This is, however, unproblematic due to the circumstance that the probe carrier insert 28 is screwed to the measuring probe 40 and is thus braced together with this in the direction of the longitudinal axes S and E, because the threads 26, 30 meshing with one another are braced axially in relation to one another based on this bracing and a frictional interaction brought about on the basis of this bracing thus guarantees a stable holding of the probe carrier insert 28 in the probe socket 14. A corresponding axial bracing also develops between the internal thread 38 provided on the probe carrier insert 28 and the external thread provided at the measuring probe 40.

Figure 2:
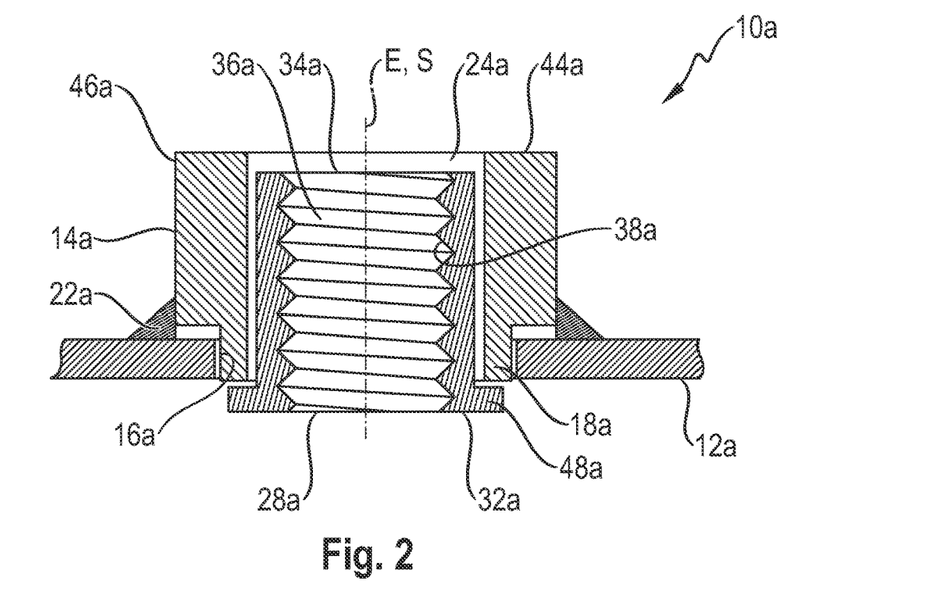
FIG. 2 is a sectional view of a probe carrier arrangement of an alternative configuration.

An alternative embodiment of the probe carrier arrangement is shown in FIG. 2. Components that correspond to above-described components concerning configuration and function are designated by the same reference number with the suffix "a" added.

In the configuration of the probe carrier arrangement 10a shown in FIG. 2, the probe socket 14a is essentially unstructured, i.e., it is configured especially without internal thread, on the inner circumference of the insert-receiving opening 24a formed therein. For example, the insert-receiving opening 24a may have an essentially cylindrical configuration, i.e., it may be provided with the essentially constant cross-sectional geometry and cross-sectional dimension in the direction of the insert-receiving opening longitudinal axis E. The probe carrier insert 28a is correspondingly also essentially unstructured on its outer circumference and is configured especially without external thread. In adaptation to the geometry of the insert-receiving opening, the probe carrier insert 28a may also be provided with an essentially cylindrical geometry on the external circumference of the length area thereof, which is to be received in the probe socket 14a.

In the area of its axial end 32a located close to the probe carrier body 12a, the probe carrier insert 28a has a radially outwards projecting insert flange 48a extending preferably completely around the probe-receiving opening longitudinal axis S. The probe carrier insert 28a is supported with this insert flange 48a in the direction of the insert-receiving opening longitudinal axis E axially at the axial end 18a of the probe socket 14a, which axial end 18a is located close to the probe carrier body 12a and especially meshes with the opening 16a.

The probe carrier insert 28a and the insert-receiving opening 24a can be coordinated with one another such that a press fit is generated during the assembly of the probe carrier arrangement 10a when the probe carrier insert 28a is inserted into the insert-receiving opening 24a. The probe carrier insert 28a can thus be prevented from falling out of the probe socket 14 even in a state in which a measuring probe is not yet screwed into the probe carrier insert 28a. If a measuring probe is screwed into the probe-receiving opening 36a, so that it is axially supported with its head area visible in FIG. 1 at the probe support surface 44a formed at the probe socket 14a, a bracing is generated between the measuring probe and the probe carrier insert 28a, because this is pressed with its insert flange 48a against the axial end 18a of the probe socket 14a. A stable and gastight holding is guaranteed hereby as well for a measuring probe, which stable and gastight holding is not influenced essentially by different coefficients of thermal expansion of the probe socket 14a, on the one hand, and of the probe carrier insert 28a, on the other hand.

It should be pointed out that the probe socket 14a can be connected to the probe carrier body 12a in the above-described manner in the case of this configuration as well and the materials of the same type or of different types, which were described above with reference to FIG. 1, may be selected for the probe carrier body 12a, the probe carrier socket 14a and the probe carrier insert 28a and the measuring probe, which is not shown in FIG. 2.

Figure 3:
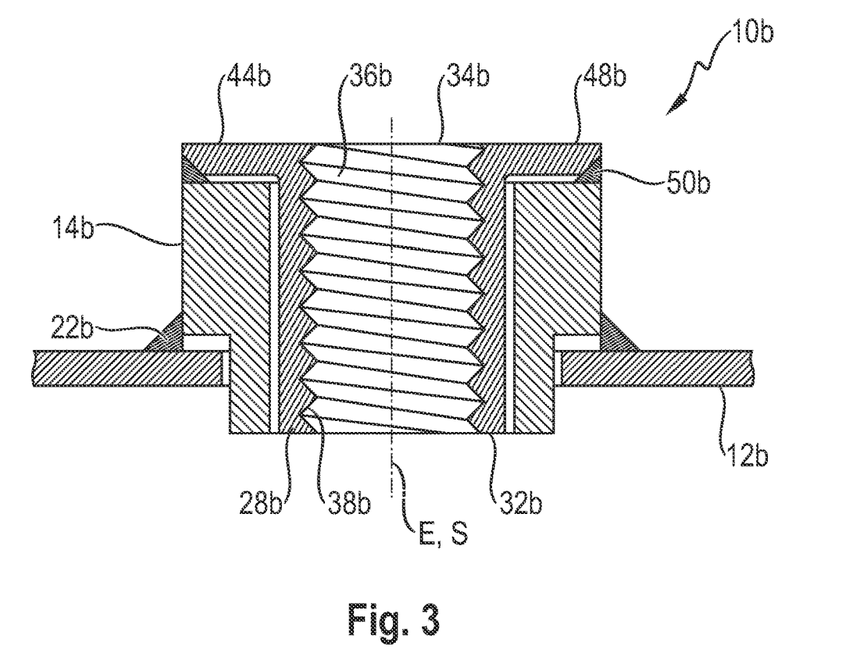
FIG. 3 is a sectional view of another probe carrier arrangement of an alternative configuration.

Another alternative embodiment of the probe carrier arrangement is shown in FIG. 3. Components that correspond to above-described components in terms of configuration and function are designated by the same reference numbers with the suffix "b" added.

The configuration according to FIG. 3 differs from the configuration shown in FIG. 2 essentially in that the insert flange 48a is supported axially at the axial end 46a of the probe socket 14a, which axial end 46a is located at a distance from the probe carrier body 12a. Since the insert flange 48a covers the end face of the probe socket 14a, which end face faces away from the probe carrier body 12a, the probe carrier insert 28a provides at its axial end 34b located at a distance from the probe carrier body 12b essentially with the insert flange 48b the probe support surface 44b, at which the head area of the measuring probe can be supported axially.

A connection in substance, for example, by a weld seam 50b extending completely circumferentially about the longitudinal axes E, S, is provided in this embodiment for a permanent connection between the probe socket 14b and the probe carrier insert 28b. This connection may also be prepared by different welding methods, especially the above-described welding methods. If different materials, i.e., for example, ferritic metallic material and austenitic metallic material, are used for the probe socket 14b, on the one hand, and the probe carrier insert 28b, on the other hand, this means that a welded connection is prepared between two such materials, which also have especially different coefficients of thermal expansion. However, since this welded connection is prepared at the axial end 46b of the probe socket 14b that is located at a distance from the probe carrier body 12b, this welded connection is located in an area subject to a lower thermal stress than, for example, the weld seam 22b prepared in the area in which the probe socket 14b adjoins the probe carrier body 12b. The risk that such high stresses could develop in the area of the weld seam 50b on the basis of different thermal expansions that damage to the weld seam 50b could develop is consequently absent. Further, it is especially advantageous that the measuring probe comes into contact exclusively with the probe carrier insert 28b, so that a risk of corrosion introduced because of different materials is eliminated.

Figure 4:
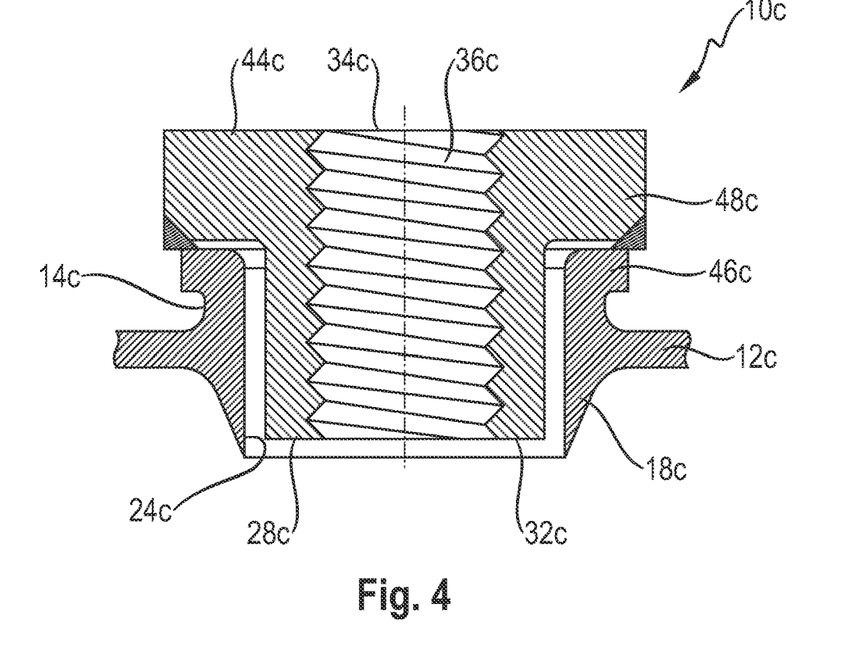
FIG. 4 is a sectional view of another probe carrier arrangement of an alternative configuration.

Another alternative embodiment of the probe carrier arrangement is shown in FIG. 4. Components that correspond to above-described components in terms of configuration and function are designated by the same reference number with the suffix "c" added.

In the configuration shown in FIG. 4, the probe carrier body 12c is made integrally with the probe socket 14c, i.e., in one piece or as a block of material. This can be prepared, for example, by subjecting a tubular or plate-like blank for the probe carrier body 12c to a flow drilling process, during which the material forming the blank is deformed by a high load by means of a rotating mandrel where an opening, i.e., the insert-receiving opening 24c, and with this also the probe socket 14c are to be formed. The shape of the shaped area, which is formed in the process and provides the probe socket 14c, can also be determined by the shaping of the mandrel used in the shaping process also known under the name flow drill process, glow drill process or thermodrill process.

In this configuration, the probe carrier insert 28c with its insert flange 48c is positioned such that it extends radially over the axial end 46c of the probe socket 14c, which axial end is located at a distance from the probe carrier body 12c and is connected to this in a permanent and gastight manner by the weld seam 50c by connection in substance. The probe support surface 44c is provided at the axial end 34c of the probe carrier insert 28c, which end is located at a distance from the probe carrier body 12c.

Each of the above-described embodiments has the essential advantage that a material especially suitable for connecting the probe socket to the probe carrier body can be used for the probe socket. If, for example, the probe carrier body is made with a ferritic material, the probe socket may also be prepared with ferritic material. If the probe carrier body is made with an austenitic material, the probe socket may be made with an austenitic material as well. Corresponding statements can also be made concerning the selection of the material used for the probe carrier insert in reference to the material of a measuring probe to be received therein. If the measuring probe is made with an austenitic material especially in its area intended for the connection to the probe carrier insert, it is especially advantageous if the probe carrier insert is also made with an austenitic material. If the measuring probe is made with a ferritic material in its area intended for the connection to the probe carrier insert, the probe carrier insert may be made with a ferritic material as well.

For example, Ferrite No. 1.4509 according to DIN EN 10088-02 with the designation X2CrTiNb18 or Ferrite No. 1.4521 according to DIN EN 10088-02 with the designation X2CrMoTi18-2 may be used as ferritic materials. For example, Austenite No. 1.4301 according to DIN EN 10088-02 with the designation X5CrNi18-10 or austenite No. 1.4828 according to DIN EN 10088-02 with the designation X15CrNiSi20-12 may be used as austenitic materials.

It is always guaranteed by the configuration according to the present invention of the probe carrier arrangement that different expansions caused by thermal stresses in the area of the probe socket, on the one hand, and of the elements adjoining same, i.e., of the probe carrier insert and of the probe carrier body, on the other hand, cannot lead to such mechanical stresses that connections, especially connections in substance, could be damaged. The risk of development of excessive corrosion due to different materials that are in contact with one another is also absent.

Further, it is especially advantageous that it is possible to easily make an adaptation to different building environments by the combination of components configured, for example, with different materials or/and also with different shaping methods. For example, probe carrier inserts with differently dimensioned probe-receiving openings may be stocked in order to make it possible to mount measuring probes of different shapes in this with an unchanged mode of construction of the probe socket. It is also possible to provide a plurality of probe-receiving openings in a probe carrier insert in order to make it possible to mount a plurality of measuring probes at a probe socket in this manner. It should also be pointed out, in principle, that these advantages offered in terms of the variability of a probe carrier arrangement may also be used if identical materials are selected for the different components thereof, especially the probe socket and the probe carrier insert.

While specific embodiments of the invention have been shown and described in detail to illustrate the application of the principles of the invention, it will be understood that the invention may be embodied otherwise without departing from such principles.

What is claimed is:

1. A probe carrier arrangement comprising:
    a probe carrier body;
    a probe socket provided at the probe carrier body, the probe socket having at least one insert-receiving opening extending in a direction of an insert-receiving opening longitudinal axis, the probe socket having a first axial end located closest to the probe carrier body and a second axial end located at a distance from the probe carrier body; and
    a probe carrier insert arranged in the insert-receiving opening, the probe carrier insert having at least one probe-receiving opening extending in a direction of a probe-receiving opening longitudinal axis, an internal thread being provided on an inner circumference of the probe-receiving opening, wherein:
        a probe support surface enclosing the insert-receiving opening is formed at the second axial end of the probe socket;
        the probe carrier insert does not project axially beyond the insert receiving opening at the second axial end of the probe socket;
        the probe carrier insert comprises an insert flange projecting radially outwards in relation to the probe-receiving opening longitudinal axis; and
        the insert flange is supported in the direction of the probe-receiving opening longitudinal axis at the probe socket, or the insert flange is supported in the direction of the probe-receiving opening longitudinal axis at the probe carrier body, or the insert flange is supported in the direction of the probe-receiving opening longitudinal axis at the probe socket and at the probe carrier body.

2. A probe carrier arrangement in accordance with claim 1, wherein the probe socket is formed separately from the probe carrier body and is fixed to the probe carrier body by a connection in substance.

3. A probe carrier arrangement in accordance with claim 1, wherein the probe socket is made integrally with the probe carrier body by flow drilling.

4. A probe carrier arrangement in accordance with claim 1, wherein the probe carrier insert is connected to the probe socket by thread meshing.

5. A probe carrier arrangement in accordance with claim 4, wherein:
    an internal thread is provided on an inner circumferential area of the insert-receiving opening; and
    an external thread meshing with the internal thread of the probe socket is provided on an outer circumferential area of the probe carrier insert.

6. A probe carrier arrangement in accordance with claim 1, wherein:
    an inner circumferential area of the insert-receiving opening has an essentially unstructured and essentially cylindrical configuration; or
    an outer circumferential area of the probe carrier insert has an essentially unstructured and essentially cylindrical configuration; or an inner circumferential area of the insert-receiving opening and an outer circumferential area of the probe carrier insert have an essentially unstructured and essentially cylindrical configuration.

7. A probe carrier arrangement in accordance with claim 6, wherein the probe carrier insert is received in the insert-receiving opening of the probe socket with a press fit.

8. A probe carrier arrangement in accordance with claim 1, wherein the insert flange is supported at the first axial end of the probe socket.

9. A probe carrier arrangement in accordance with claim 1, wherein:
    an element comprised of one of the probe socket and the probe carrier insert is made with an austenitic material; and
    another element comprised of the other of the probe socket and the probe carrier insert is made with a ferritic material.

10. An exhaust system for an internal combustion engine, the exhaust system comprising:
    an exhaust gas-carrying housing; and
    a probe carrier arrangement comprising:
    a probe carrier body provided by the exhaust gas-carrying housing;
    a probe socket provided at the probe carrier body, the probe socket having at least one insert-receiving opening extending in a direction of an insert-receiving opening longitudinal axis, the probe socket having a first axial end located closest to the exhaust gas-carrying housing and a second axial end located at a distance from the exhaust gas-carrying housing; and
    a probe carrier insert arranged in the insert-receiving opening, the probe carrier insert having at least one probe-receiving opening extending in a direction of a probe-receiving opening longitudinal axis, wherein the probe carrier insert comprises an insert flange supported at the first axial end of the probe socket.

11. An exhaust system in accordance with claim 10, wherein a probe support surface is formed for a measuring probe received in the probe-receiving opening, wherein the probe support surface is at an axial end of the probe socket located at a distance from the housing or the probe support surface is at an axial end of the probe carrier insert located at a distance from the housing.

12. An exhaust system in accordance with claim 10, wherein the probe carrier insert is connected by a connection in substance to the probe socket in an axial end area of the probe socket, which axial end area is located at a distance from the housing.

13. An exhaust system in accordance with claim 10, wherein:
    an element comprised of one of the probe socket and the probe carrier insert is made with an austenitic material; and
    another element comprised of the other of the probe socket and the probe carrier insert is made with a ferritic material.

14. An exhaust system in accordance with claim 13, further comprising a measuring probe comprised of an austenitic metallic material, wherein:
    the measuring probe has an external thread;
    the at least one probe-receiving opening of the probe carrier insert has an internal thread; and
    the external thread of the measuring probe meshes with the internal thread of the probe carrier insert.

15. A probe carrier arrangement comprising:
a probe carrier body;
a probe socket provided at the probe carrier body, the probe socket having at least one insert-receiving opening extending in a direction of an insert-receiving opening longitudinal axis, the probe socket having a first axial end located closest to the probe carrier body and a second axial end located at a distance from the probe carrier body; and
a probe carrier insert arranged in the insert-receiving opening, the probe carrier insert having at least one probe-receiving opening extending in a direction of a probe-receiving opening longitudinal axis, an internal thread being provided on an inner circumference of the probe-receiving opening, wherein:
a probe support surface enclosing the insert-receiving opening is formed at the second axial end of the probe socket; and
the probe carrier insert does not project axially beyond the insert receiving opening at the second axial end of the probe socket;
wherein:
an inner circumferential area of the insert-receiving opening has an essentially unstructured configuration and essentially cylindrical configuration; or
an outer circumferential area of the probe carrier insert has an essentially unstructured configuration and essentially cylindrical configuration; or
an inner circumferential area of the insert-receiving opening and an outer circumferential area of the probe carrier insert have an essentially unstructured and essentially cylindrical configuration;
wherein:
the probe carrier insert is received in the insert-receiving opening of the probe socket with a press fit.

* * * * *

UNITED STATES PATENT AND TRADEMARK OFFICE
CERTIFICATE OF CORRECTION

| | | |
|---|---|---|
| PATENT NO. | : 11,467,063 B2 | Page 1 of 1 |
| APPLICATION NO. | : 16/799472 | |
| DATED | : October 11, 2022 | |
| INVENTOR(S) | : Mohr et al. | |

It is certified that error appears in the above-identified patent and that said Letters Patent is hereby corrected as shown below:

On the Title Page

Item (72) Inventors, correct the city address on this inventor:
Philippe Leisten, Rübgarten (DE)

Signed and Sealed this
Twentieth Day of June, 2023

Katherine Kelly Vidal
*Director of the United States Patent and Trademark Office*